United States Patent
Henault et al.

(10) Patent No.: US 10,309,689 B2
(45) Date of Patent: Jun. 4, 2019

(54) FACILITY FOR CONCENTRATING COSMIC RADIATION EQUIPPED WITH A REFLECTIVE OPTICAL SURFACE INSPECTION SYSTEM

(71) Applicant: CENTRE NATIONAL DE LA RECHERCHE SCIENTIFIQUE, Paris (FR)

(72) Inventors: François Henault, Grenoble (FR); Cyril Caliot, Font Romeu (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 176 days.

(21) Appl. No.: 15/127,746

(22) PCT Filed: Mar. 24, 2015

(86) PCT No.: PCT/EP2015/056248
§ 371 (c)(1),
(2) Date: Sep. 20, 2016

(87) PCT Pub. No.: WO2015/144699
PCT Pub. Date: Oct. 1, 2015

(65) Prior Publication Data
US 2017/0130994 A1    May 11, 2017

(30) Foreign Application Priority Data
Mar. 27, 2014  (FR) ...................................... 14 52622

(51) Int. Cl.
*G01C 3/08*    (2006.01)
*F24S 23/79*   (2018.01)
(Continued)

(52) U.S. Cl.
CPC ............... *F24S 23/79* (2018.05); *F24S 23/71* (2018.05); *F24S 23/77* (2018.05); *G01M 5/005* (2013.01);
(Continued)

(58) Field of Classification Search
CPC .. F24S 23/79; F24S 23/71; F24S 23/77; F24S 2050/25; G01M 5/005; G01M 11/005;
(Continued)

(56) References Cited

U.S. PATENT DOCUMENTS 5,477,332 A   12/1995  Stone et al.
5,982,481 A   11/1999  Stone et al.
(Continued)

FOREIGN PATENT DOCUMENTS

DE   100 56 077 A1   5/2002
EP   1 717 568 A2    11/2006

OTHER PUBLICATIONS

Guangdong Zhu, "Development of an analytical optical method for linear Fresnel collectors," Solar Energy, vol. 94, Aug. 1, 2013, pp. 240-252, XP055158766.
(Continued)

*Primary Examiner* — Samantha K Abraham
(74) *Attorney, Agent, or Firm* — Baker & Hostetler LLP

(57) ABSTRACT

The invention relates to an apparatus for concentrating cosmic radiation originating from a celestial object, said apparatus comprising: a concentrating optical surface able to reflect incident cosmic radiation toward a target surface O'X'Y', and liable to contain local surface errors and aiming and orientation errors; a system for inspecting the reflective optical surface; means for acquiring images of the optical surface from various viewpoints $M'_{mn}$ ($X'_{mn}$, $y'_{mn}$) that are located on the target surface, m varying from 1 to M and n
(Continued)

varying from 1 to N, so as to obtain M×N images of the optical surface illuminated by the cosmic radiation, with M viewpoints along X' and N viewpoints along Y', where M>1, N>1 and M·N≥30; and a unit for processing the M·N acquired images, which unit is suitable for: calculating the slopes $\delta\Delta(P)/\delta x$ and $\delta\Delta(P)/\delta y$ for each point $P(x,y)$ of the reflective optical surface, where:

$$\frac{\partial \Delta(P)}{\partial x} = g_X \, \varepsilon_0 \frac{\sum_{m=1}^{M}\sum_{n=1}^{N} \operatorname{sign}(x'_{mn}) \, L(M'_{mn}, P)}{\sum_{m=1}^{M}\sum_{n=1}^{N} L(M'_{mn}, P)}, \text{ and}$$

$$\frac{\partial \Delta(P)}{\partial y} = g_Y \, \varepsilon_0 \frac{\sum_{m=1}^{M}\sum_{n=1}^{N} \operatorname{sign}(y'_{mn}) \, L(M'_{mn}, P)}{\sum_{m=1}^{M}\sum_{n=1}^{N} L(M'_{mn}, P)},$$

$L(M'_{mn}, P)$ being the luminance at a point of the image corresponding to the point $P(x,y)$ of the reflective optical surface (2) observed from the viewpoint $M'_{mn}$, $\varepsilon_0$ the apparent angular radius of the celestial object and $g_x$ and $g_y$ preset coefficients; and determining from these slopes $\delta\Delta(P)/\delta x$ and $\delta\Delta(P)/\delta y$, a local surface error $\Delta P(x,y)$ at the point $P(x,y)$ of the reflective optical surface (2).

11 Claims, 13 Drawing Sheets

(51) Int. Cl.
| | | |
|---|---|---|
| *F24S 23/77* | (2018.01) | |
| *G01M 5/00* | (2006.01) | |
| *G01M 11/08* | (2006.01) | |
| *H04N 5/225* | (2006.01) | |
| *H04N 5/232* | (2006.01) | |
| *G01M 11/00* | (2006.01) | |
| *F24S 23/71* | (2018.01) | |
| *F24S 50/20* | (2018.01) | |

(52) U.S. Cl.
CPC ........ *G01M 11/005* (2013.01); *G01M 11/081* (2013.01); *H04N 5/2258* (2013.01); *H04N 5/23296* (2013.01); *F24S 2050/25* (2018.05); *Y02E 10/42* (2013.01); *Y02E 10/52* (2013.01)

(58) Field of Classification Search
CPC ............... G01M 11/081; H04N 5/2258; H04N 5/23296; Y02E 10/42; Y02E 10/52
See application file for complete search history.

(56) References Cited

U.S. PATENT DOCUMENTS

| | | | |
|---|---|---|---|
| 7,667,833 | B1 | 2/2010 | Diver |
| 2008/0047599 | A1* | 2/2008 | Buller ............. H01L 31/035281 136/251 |
| 2012/0031463 | A1* | 2/2012 | Schmaelzle ............ H02S 40/22 136/246 |
| 2012/0033301 | A1* | 2/2012 | Schmaelzle ............ F24S 23/00 359/592 |
| 2012/0293808 | A1 | 11/2012 | Parks et al. |
| 2013/0202215 | A1 | 8/2013 | Yonetani et al. |

OTHER PUBLICATIONS

Yulie Wu et al., "An improved phase retrieval algorithm for optical aspheric surface measurement," Optics Communications, vol. 284, No. 6, Nov. 16, 2011, pp. 1496-1503, XP028137794.
F. Hénault et al., "Solar radiation focusing: analysis and determination of reflecting facets point spread functions and alignment errors," Journal Optics, 1989, vol. 20, No. 5, pp. 225-240.
B. Belhomme et al., "A New Fast Ray Tracing Tool for High-Precision Simulation of Heliostat Fields," Journal of Solar Energy Engineering, vol. 131, Aug. 2009.
P. Su et al., Software configurable optical test system: a computerized reverse Hartmann test, Applied Optics, vol. 49, No. 23, Aug. 10, 2010, pp. 4404-4412.
Steffen Ulmer, "Automated High Resolution Measurement of Heliostat Slop Errors," German Aerospace Center.

* cited by examiner

FACILITY FOR CONCENTRATING COSMIC RADIATION EQUIPPED WITH A REFLECTIVE OPTICAL SURFACE INSPECTION SYSTEM

CROSS-REFERENCE TO RELATED APPLICATIONS

This application is a National Stage of International patent application PCT/EP2015/056248, filed on Mar. 24, 2015, which claims priority to foreign French patent application No. FR 1452622, filed on Mar. 27, 2014, the disclosures of which are incorporated by reference in their entirety.

FIELD OF THE INVENTION

The field of the invention is that of the inspection of the reflective optical surfaces of an apparatus for concentrating cosmic radiation, for example used in a concentrated solar power plant intended to produce solar-thermal electricity.

BACKGROUND

The conversion of concentrated solar power into household and industrial electricity is one of the most promising ways of generating renewable energy in the 21st century. Future solar-thermal power plants will typically be made up of a thermal receiver 1 installed at the top of a tower of several hundred meters height, and hundreds or thousands of heliostats placed on the ground, each including a surface 2 for reflecting incident rays 3 and ensuring the sun is tracked and its radiation concentrated, in a set direction, toward the receiver 1 as shown in FIG. 1*a*; the heliostats are orientable and the receiver is fixed. Mention may be made of other types of cosmic-radiation concentrators, such as individual concentrators that are directed toward the radiation source (shown in FIG. 1*b*) but that concentrate the radiation towards a receiver 1 in a direction that varies with the orientation of the concentrator (the assembly made up of the concentrating reflector surface 2 and the receiver 1 being orientable), double-mirror solar furnaces including a field of orientable planar heliostats, each heliostat including a planar surface 2*b* for reflecting incident rays 3, and a stationary concentrating surface 2*a* that concentrates the radiation on a fixed receiver 1 (shown in FIG. 1*c*), such as that of Odeillo in France the dimensions of which are indicated in the figure.

Among the many technological challenges remaining to be addressed feature those of the time and effort devoted to adjusting and inspecting heliostats, or more generally reflective optical surfaces, before the plant is commissioned, and of the need to regularly monitor them in operation.

Each reflective concentrating surface (also referred to by the term "mirror") is generally, but not necessarily, segmented into a plurality of facets or segments. Each reflective concentrating surface may be parabolic or even spherical or planar, as indicated in the above examples.

The main characteristic optomechanical defects in a reflective surface 2 (or 2*a*) for concentrating cosmic radiation when said surface is segmented into reflecting facets 21 are shown in FIG. 2; in this figure, two facets $O_i$ and $O_j$ may be seen. These optomechanical defects may essentially be divided into three categories:

Local surface errors $\delta l$, which represent the deviation of the reflective facet from an ideal spherical or parabolic shape. These errors may have many origins: manufacturing quality, deformation under mechanical stresses, the effects of the environment, etc. They are generally very variable from one facet to the next.

Errors $\delta n$ the orientation of the facets with respect to one another; defects in X-, Y- and Z-axial positions have a negligible influence on the concentration factor.

Lastly, the error $\delta p$ in the overall aim of the heliostat or concentrator, this error having the effect of adding an average plane that is inclined with respect to all of the facets.

In the case of a concentrating surface that is not segmented into facets, there is no reason for there to be any errors $\delta r$ in the orientation of the facets with respect to one another; any optomechanical defects are then due to local surface errors $\delta l$ and the error $\delta p$ in overall aim.

Once any optomechanical defects have been identified, the adjustment consists in correcting the shape of the mirrors 2, typically by means of mechanical actuators located therebehind and allowing, depending on their design, the orientation (attitude), average curvature or higher-order defects of the mirrors to be corrected. However, experience acquired with existing solar plants (for example, in France, the THEMIS plant in Targasonne or the 1000 kW solar furnace in Odeillo) suggest that these operations for measuring errors and making adjustments will require several months or even years if current techniques are applied to an industrial scale plant of 10 megawatts or more. Furthermore, these operations sometimes require the focal point of the plant to be occupied, thus decreasing boiler uptime.

These optomechanical defects are measured either by taking measurements in the laboratory, the final shape that the facets will have in operation then not being precisely known, or by taking measurements in the field.

Most current techniques, such as optimization of the flux collected by a detector located at the focal point of the plant, or remote observation of a target in the focal plane, disrupt the operation of the solar plant: specifically, these methods involve obstructing the access of the solar rays to the boiler (=the thermal receiver). These techniques are based on a measurement of luminance in the target plane of the receiver (flux densities), from which overall conclusions are drawn on the quality of the reflective surfaces, but they in particular do not allow any local surface errors $\delta l$ to be determined.

Another solution consists in using a deflectometry technique (observation of a grid or one-dimensional array of fringes through the reflective surfaces) but this technique does not work with apparatuses of the type described with reference to FIGS. 1*b* and 1*c*, and the configuration of the inspection, carried out in the laboratory for example, or with a pair of non-conjugated points, is very different from that of the end-use. This technique furthermore requires image processing that is complex or even impossible.

What are called "backward gazing" methods, which consist in placing a detector in the middle of the target plane and from there directly observing images of the radiation source, or luminance distributions on the reflecting surface, are also known, as described in the publication by F. Hénault and C. Royère: "Solar radiation focusing: analysis and determination of reflecting facets point spread functions and alignment errors", J. Optics 1989, vol 20, n°5, pp. 225-240. However, such methods do not allow a quantitative measurement of local surface errors $\delta l$ and provide only a crude measurement of the errors $\delta r$ in the orientation of the facets with respect to one another.

Therefore, there remains to this day a need for an apparatus the reflective surfaces of which can be inspected without disrupting operation of the apparatus and in less time.

The principle of the invention consists in observing, from a plurality of observation points located on the target surface of a working apparatus for concentrating cosmic radiation, the distributions of luminance visible on the surface of the reflecting surfaces, and in deducing therefrom quantitative information on the local surface errors, aiming errors and possibly orientation errors thereof.

SUMMARY OF THE INVENTION

More precisely, one subject of the invention is an apparatus for concentrating cosmic radiation originating from a celestial object, said apparatus comprising:

a concentrating optical surface able to reflect incident cosmic radiation toward a target surface O'X'Y' and liable to contain local surface errors and aiming and orientation errors; and a system for inspecting the reflective optical surface.

It is mainly characterized in that the inspecting system comprises:

means for acquiring images of the optical surface from various viewpoints $M'_{mn}$ ($x'_{mn}$, $y'_{mn}$) that are located on the target surface, m varying from 1 to M and n varying from 1 to N, so as to obtain M×N images of the optical surface illuminated by the cosmic radiation, with M viewpoints along X' and N viewpoints along Y', where M>1, N>1 and M·N≥30;

and a unit for processing the M·N acquired images, which unit is suitable for:

calculating the slopes $\delta\Delta(P)/\delta x$ and $\delta\Delta(P)/\delta y$ for each point P(x,y) of the reflective optical surface, where:

$$\frac{\partial \Delta(P)}{\partial x} = g_X \, \varepsilon_0 \frac{\sum_{m=1}^{M}\sum_{n=1}^{N} \text{sign}(x'_{mn}) \, L(M'_{mn}, P)}{\sum_{m=1}^{M}\sum_{n=1}^{N} L(M'_{mn}, P)}, \text{ and}$$

$$\frac{\partial \Delta(P)}{\partial y} = g_Y \, \varepsilon_0 \frac{\sum_{m=1}^{M}\sum_{n=1}^{N} \text{sign}(y'_{mn}) \, L(M'_{mn}, P)}{\sum_{m=1}^{M}\sum_{n=1}^{N} L(M'_{mn}, P)}, \quad L(M'_{mn}, P) \text{ being}$$

the luminance at a point of the image corresponding to the point P(x,y) of the reflective optical surface observed from the viewpoint $M'_{mn}$, $\varepsilon_0$ the apparent angular radius of the celestial object and $g_x$ and $g_y$ preset coefficients; and determining from these slopes $\delta\Delta(P)/\delta x$ and $\delta\Delta(P)/\delta y$, a local surface error $\Delta P(x,y)$ at the point P(x,y) of the reflective optical surface.

The following are the main advantages of the invention:

It allows adjustment, aiming and local surface errors in the reflective surfaces to be measured in situ and regular inspections to be carried out without disrupting the operation of the plant, such as the solar-electric power generation process.

It allows all of the reflective surfaces of a plant to be inspected and adjusted in the shortest possible time.

It requires only a limited number of observation points $M'_{mm}$.

The means for acquiring images from various viewpoints include a plurality of devices for acquiring images, which devices are respectively located at various fixed or movable positions on the target surface.

The target surface may be planar and is then designated the target plane.

According to one feature of the invention, the reflective optical surface to be inspected is orientable. In this case, the means for acquiring images from various viewpoints include at least one image-acquiring device located on the target surface and means for modifying the orientation of the reflective optical surface to be inspected.

The reflective optical surface is typically segmented into facets and the processing unit is suitable for furthermore determining errors in the orientation of the facets with respect to one another and an adjustment error of each facet.

The reflective optical surface is for example mounted in a heliostat.

The reflective optical surface is parabolic or spherical or even planar.

The apparatus for concentrating cosmic radiation may include a plurality of reflective optical surfaces.

The radiation is for example solar or lunar.

Another subject of the invention is a central-tower power plant or an individual concentrator or a double-mirror solar furnace or a Cherenkov telescope including an apparatus for concentrating cosmic radiation such as described.

BRIEF DESCRIPTION OF THE DRAWINGS

Other features and advantages of the invention will become apparent on reading the following detailed description, which is given by way of nonlimiting example and with reference to the appended drawings, in which.

From one figure to the next, the same elements are referenced by the same references.

DETAILED DESCRIPTION

In the rest of the description, a concentrated solar power plant will mainly be discussed by way of exemplary use. However, the invention also applies to an apparatus for concentrating lunar energy and to a Cherenkov telescope array used for high-energy astrophysics, the specifications of which are similar to those required for a solar concentrator. The target surface is also by way of example a target plane.

Figure 3A:
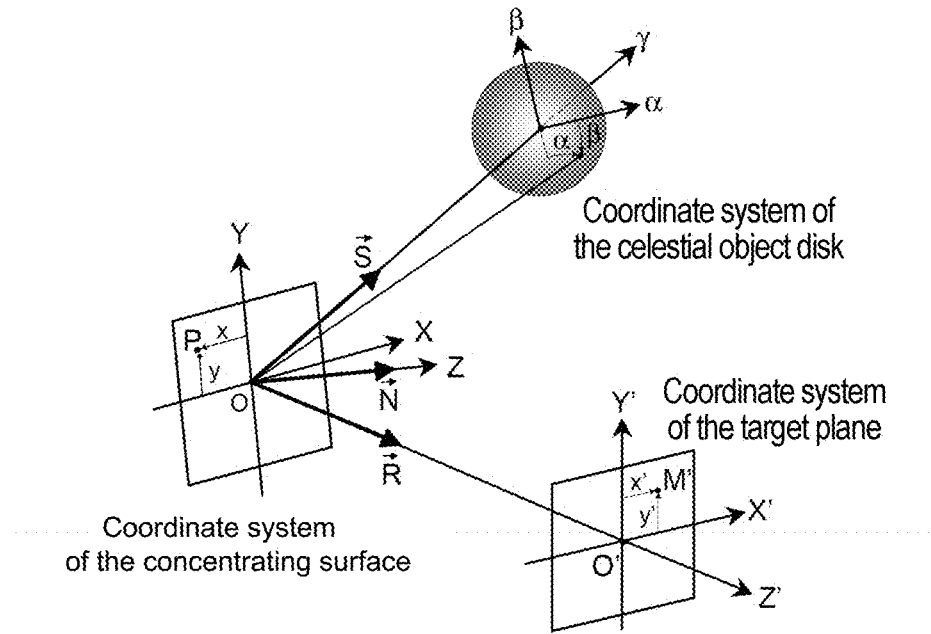
FIGS. 3a-3b schematically show the coordinate systems and scientific notations employed in the case of an overview including the radiation source, the concentrating surface and the target plane (FIG. 3a) and in the case of an overview including the concentrating apparatus with the concentrating surface, the target plane in which the various (four in the example in the figure) viewpoints of the concentrating surface are located, and the plane of the images of the concentrating surface, which images are obtained from these viewpoints (FIG. 3b)
Figure 3B:
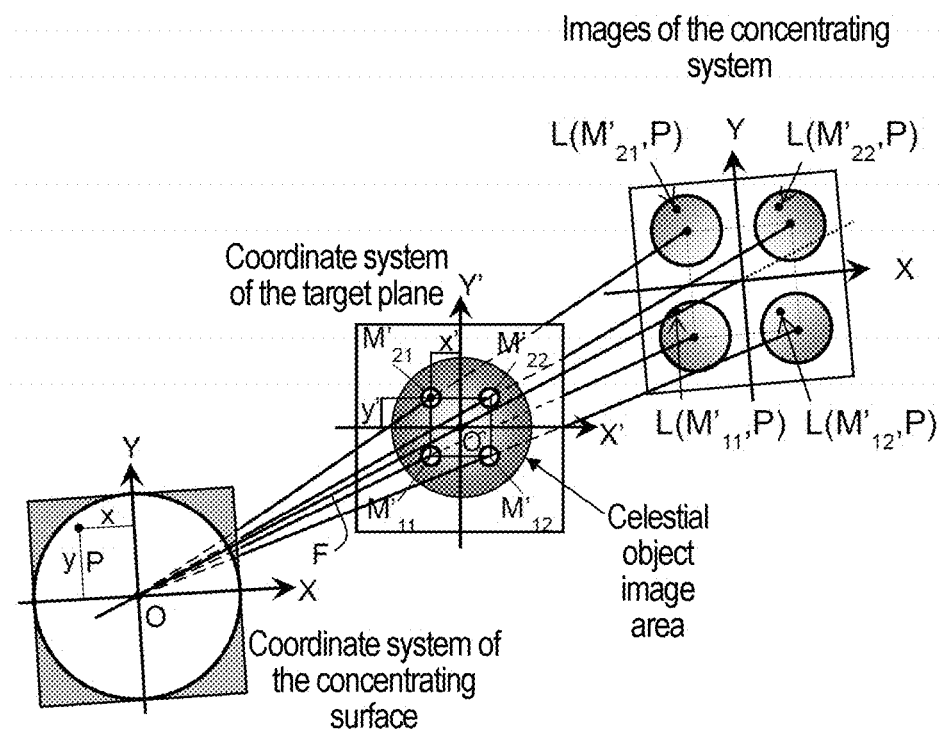

The main notations and coordinate systems employed below are indicated in FIGS. 3a and 3b. Three coordinate systems are essentially used:

The system $O\alpha\beta\gamma$ of celestial angular coordinates, in which system the axis $O\gamma$ is directed in line with the vector $\vec{S}$ toward the center of the sun (or toward any other targeted celestial object), and in which neighboring directions are designated by their angular coordinates $(\alpha,\beta)$. In practice $\alpha$ and $\beta$ are considered to be quantities of the first order with respect to 1.

The OXYZ coordinate system, which is associated with the movable or fixed concentrating surface, in which system O is the center of the reflective surface, the axis OZ, which is aligned parallel with the vector $\vec{N}$, is normal to the surface at O, and OX and OY are axes perpendicular to OZ. The points P of the reflective surface are defined by their Cartesian coordinates (x,y,z).

Figure 5A:
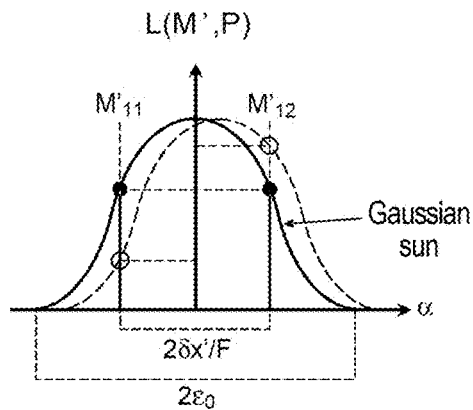
FIGS. 5a-5b illustrate the physical interpretation of the calculation of the optomechanical defects according to the invention for a theoretical Gaussian sun (FIG. 5a) and for a uniform sun as seen in practice (FIG. 5b)
Figure 5B:
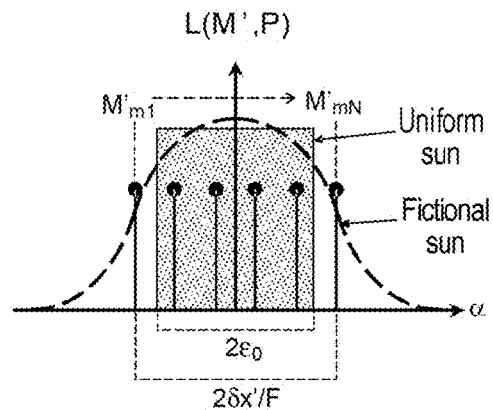

The O'X'Y'Z' coordinate system, which system is associated with a target plane O'X'Y' (in which the receiver is placed). The point O' is defined as the intersection between the solar ray reflected from the reflective surface at O and directed along the vector $\vec{R}$, and the target plane; thus OO'=F, where F is the focal length of the concentrating surface. The axis O'Z' is normal to the target plane, and is not necessarily parallel to the vector $\vec{R}$ (case in particular of the heliostats of a central-tower power plant). Likewise, the axes OZ and O'Z' are not generally coincident, except in the case of concentrators that are pointed directly to sun, an example of which is shown in FIG. 5a-5b. The points M' of the target plane are defined by their Cartesian coordinates (x', y').

It will be noted that the vectors $\vec{S}$, $\vec{N}$ and $\vec{R}$ are governed by Descartes' first law of reflection.

As may be seen in FIG. 3b, certain points M' are denoted $M'_{mn}$, where the indices m and n designate a limited number of different "viewpoints" located in the target plane, where $1 \leq m \leq M$ along the axis O'X' and $1 \leq n \leq N$ along the axis O'Y'. The coordinates of the point $M'_{mn}$ in the target plane are denoted $(x'_{mn}, y'_{mn})$. In the example in FIG. 3b, there are four observation points: M=N=2.

The general principle of the invention consists in observing, from various viewpoints $M'_{mn}$, the luminance $L(M'_{mn},P)$ distributions reflected by all of the points P of the reflected surface that it is desired to regularly inspect then adjust. At these observation points $M'_{mn}$ are placed observing devices such as commercially available CCD video cameras, which are optionally equipped with a zoom, or even simple webcams, which devices film the reflective surfaces to be inspected, $M'_{mn}$ designating the position of the observing device in the target plane. These observation points are of course located inside the area of the image of the sun (more generally of the celestial object) in the target plane; the focal point of the concentrating surface will possibly, though not necessarily, be one of these observation points. By extension, the corresponding observation device is also designated by $M'_{mn}$. Below the observing device is, by way of example, a video camera.

A plurality of observation strategies are possible, differing essentially in the number and type of movements applied to the reflective surfaces and/or to the video cameras themselves: video camera movable in the target plane, fixed video camera scanned using the movable reflective surface, system composed of a plurality of fixed video cameras, "hybrid" observation strategy.

Video Camera Movable in the Target Plane

Figure 4A:
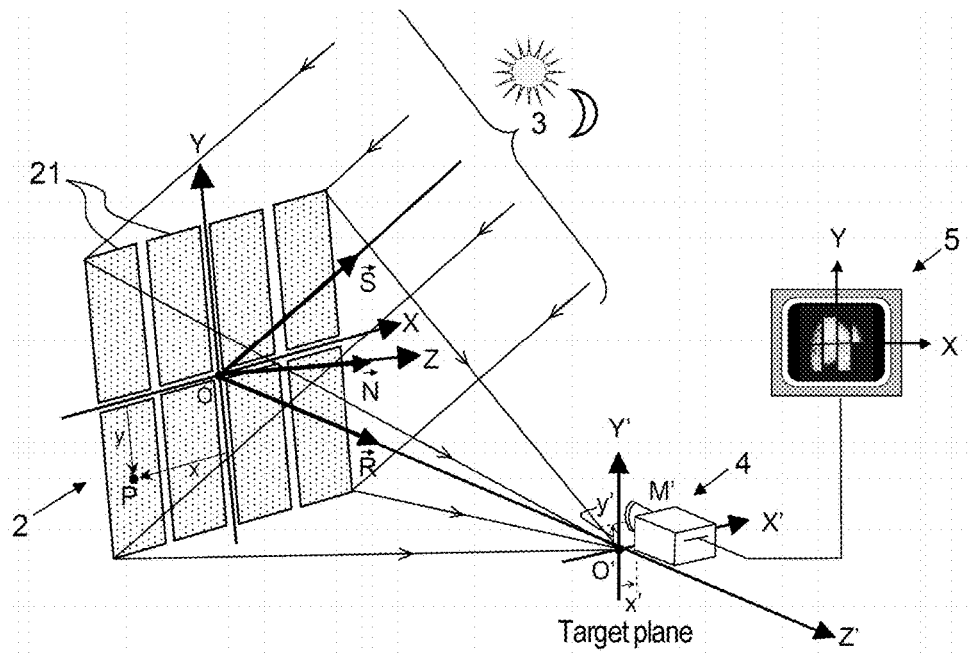
FIGS. 4a-4d schematically show various exemplary embodiments of the invention in the case of a segmented reflective surface (segmented into 8 segments of facets in the figure) with a video camera that is able to move in the target plane (FIG. 4a), a fixed video camera that is scanned using the orientable reflective surface (FIG. 4b), a plurality of fixed video cameras that are scanned using the orientable reflective surface (FIG. 4c), and a plurality of movable cameras that are scanned using the orientable reflective surface (FIG. 4d), respectively.

According to a first embodiment of the invention, shown in FIG. 4a, images representing the luminance $L(M'_{mn},P)$ distributions 5 for all the points P are accumulated by moving a single video camera (image-acquiring means 4=a single video camera) to various observation points $M'_{mn}$ located in the target plane, by means of mechanisms associated with this video camera allowing all the viewpoints $M'_{mn}$ to be scanned. However, this solution has drawbacks in terms of mechanical complexity and the time required to move the video camera in the plane O'X'Y', during which the orientation of the heliostats and therefore of the reflective surface 2 will have possibly changed in order to track the course of the sun. In addition, in the case of a fixed or movable parabolic concentrator such as a Cherenkov telescope, it disrupts the operation of the receiver.

Fixed Video Camera Scanned Using the Energy Concentrating System

Figure 4B:
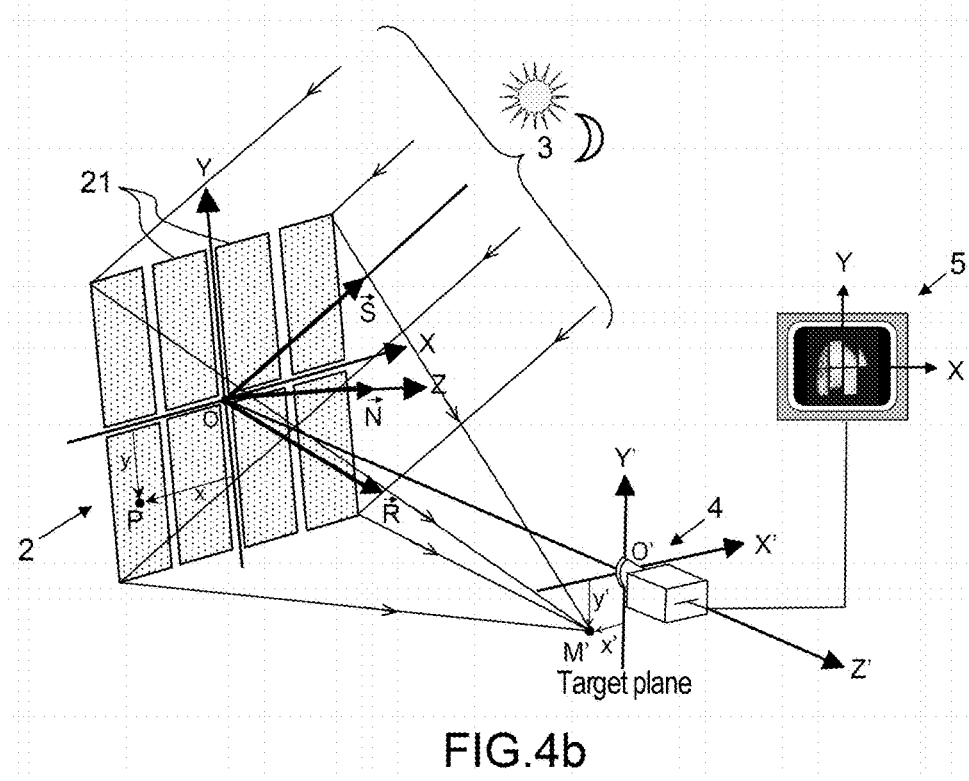

An alternative to the preceding solution involving only one single video camera is illustrated in FIG. 4b. It consists in taking advantage of the fact that for small changes of orientation of the heliostat and therefore of the reflective surface 2 in its movement tracking the sun, the luminance distributions 5 observed are identical to those that would be obtained by moving the video camera to a fictional observation point $M'_{mn}$ located in the target plane. This results in a decisive advantage with respect to the preceding solution, because the planar or focusing heliostats are by construction capable of tracking the course of the sun in the sky with a refresh rate of about a few Hz, thus allowing a complete sequence of acquisitions of the images $L(M'_{mn},P)$ 5 to be performed much more rapidly.

It is also possible to take advantage of the mobility of heliostats (and therefore of the reflective surfaces 2) controlled in open loop in order to direct them toward a target plane O'X'Y' that is independent of the receiver. Specifically, in the case of a central tower, the target plane may be located a few meters below the focal volume of the apparatus, allowing the heliostats to be inspected or to be adjusted to be individually directed in turn without disrupting the operation of the thermal receiver. Likewise, in the case of a planar heliostat illuminating the fixed concentrator of a double-mirror solar furnace, the target points may be located in directions different from that of the axis of the concentrator, and located at distances sufficiently far removed in the surrounding countryside. The strategy is also applicable to solar concentrators that are fixed or directed toward the sun, provided that the observation points $M'_{mn}$ are located in the focal volume but outside of the receiver that is itself located at the center of this focal volume. This restriction does not apply to radiation-collecting telescopes of the Cherenkov type, because in them the center of the image plane is traditionally left free in order to allow their calibrating systems to be installed. Lastly, we would like to note that in each and every case, it is possible to take advantage of the natural movement of the observed object (typically the sun or full moon), in order to make redundant one of the two rotations required to track it in the sky. In addition, this option allows the sequence of image captures to be automated by synchronizing them (by an electronic or computational means) with the movements of the heliostats: thus it is possible to substantially decrease the image acquisition time.

This observation strategy is well suited to a fixed solar concentrator of a solar furnace, or to concentrators directly servocontrolled on the sun. In these two cases (as in that of Cherenkov telescopes), it is preferable to inspect the reflective surfaces at night for example when there is a full moon, without disrupting the daytime operation of the systems. Cherenkov telescopes, which are too sensitive to parasitic light, cannot perform scientific observations on nights when there is a full moon: thus, the inspection may be carried out at night, with a simplified observation system and without disrupting the normal operation of the telescope.

In the case of the fixed concentrator of a solar furnace, the angular scan is in practice carried out by means of planar heliostats that illuminate the concentrator (this assumes that they have already been optimally adjusted themselves).

System Composed of a Plurality of Fixed Video Cameras

Figure 4C:
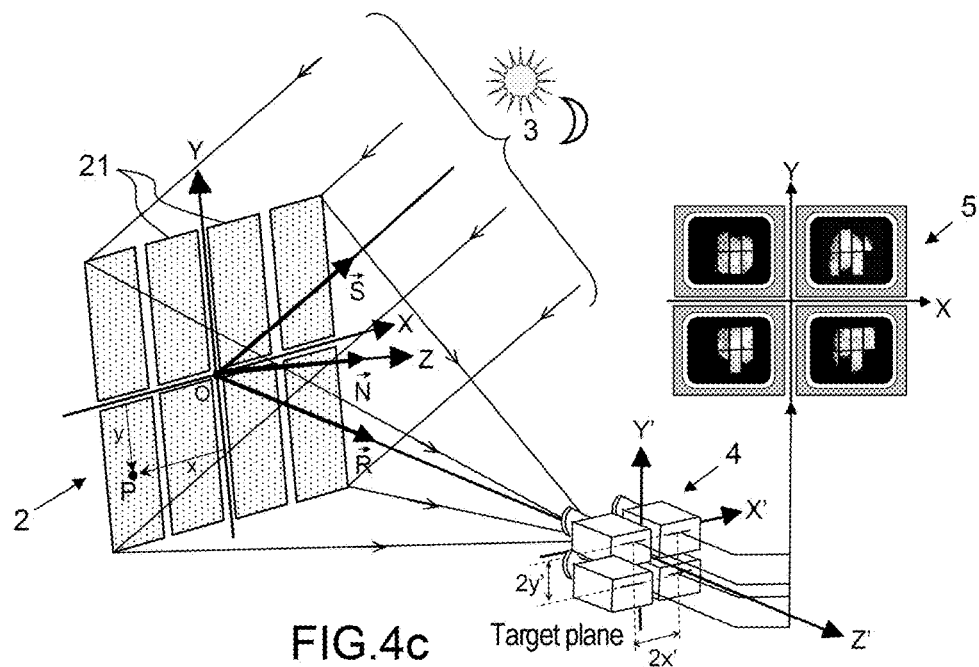

A radical alternative to the two preceding cases is illustrated in FIG. 4c; it consists in placing in the target plane O'X'Y' as many fixed video cameras as required viewpoints $M'_{mn}$ (image-acquiring means 4=M·N fixed video cameras), thus allowing the various luminance $L(M'_{mn},P)$ distributions 5 to be acquired simultaneously. This observation strategy has the following advantages and drawbacks.

Advantages

The simultaneity of the acquisitions of the images 5 allows the movements of the sun or of the moon in the sky to be suppressed and thus the precision of the overall measurement to be improved.

It also makes redundant the need for computationally intensive digital processing intended to correct the images $L(M'_{mn},P)$ 5 depending on their acquisition time if the measurement time required by the strategies described above it is too long (typically longer than 5 minutes).

Drawbacks:

The major drawback is indisputably the total cost of the required hardware, resulting from the significant increase in the number of video cameras required.

In addition, to obtain the simultaneous acquisitions, it becomes necessary to ensure the temporal synchronization of the acquisitions performed by the various video cameras, thus complicating the computational control of the measurement system.

Lastly, the orientation of the lines of sight of the video cameras must be adjusted in order to make them converge on the inspected reflective surfaces, possibly implying additional mechanical complexity.

Figure 1A:
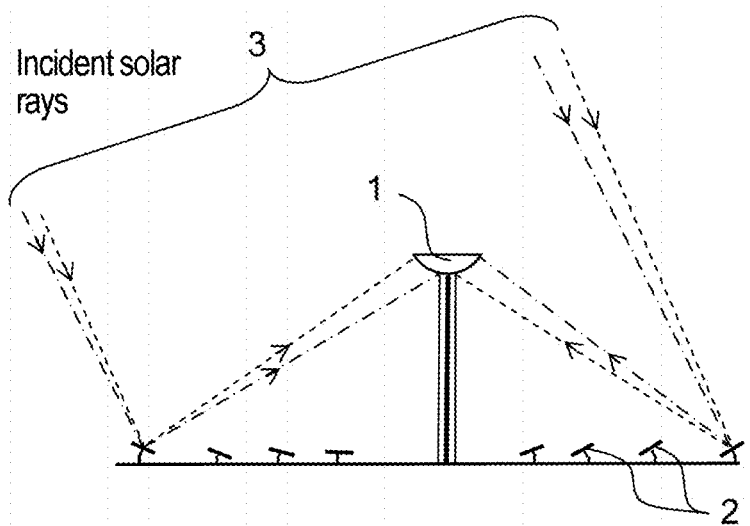
FIGS. 1a-1c, which were described above, schematically show various types of apparatus for concentrating solar radiation, namely a central tower illuminated by a field of focusing heliostats (FIG. 1a), an individual concentrator directed toward the sun (FIG. 1b), and a double-mirror solar furnace with a field of planar heliostats and a fixed concentrator (FIG. 1c)

Just like the preceding one, this strategy is particularly well suited to the heliostats of single-mirror central-tower power plants. It would appear to be more difficult to implement with solar concentrators pointed directly toward the sun or double-mirror solar furnaces (shown in FIGS. 1b and 1c, respectively), because of the required number of video cameras placed in the vicinity of the focal volume.

Hybrid" Observation Strategy

Figure 4D:
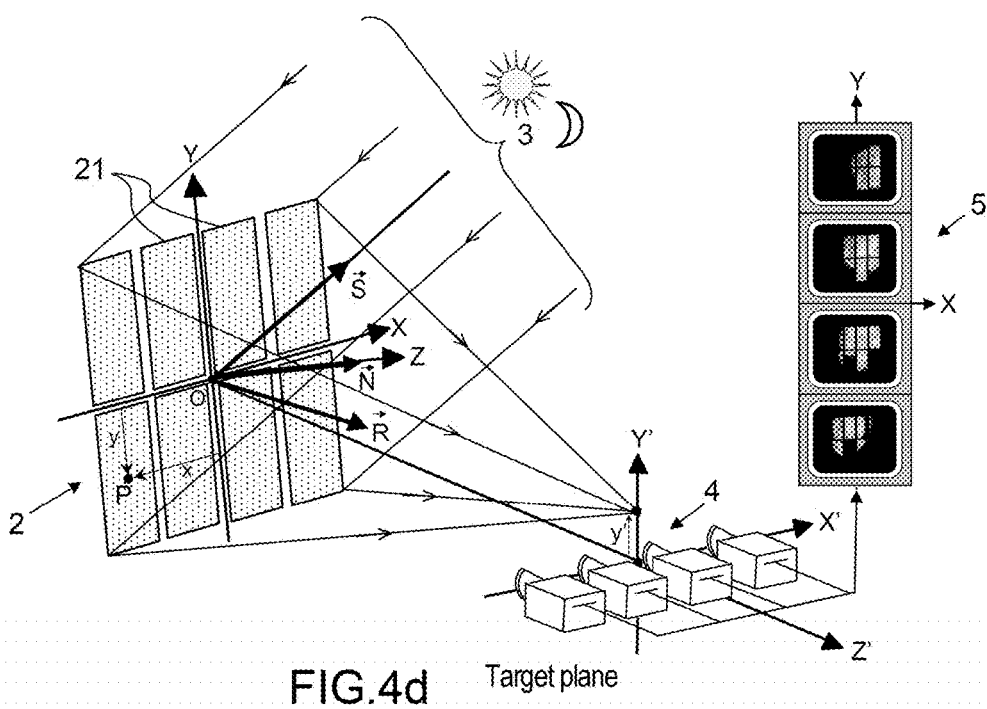

In order to capitalize on the advantages offered by the two preceding embodiments (use of a limited number of video cameras without sacrificing the rapidity of the complete acquisition sequence), it would seem natural to combine the two strategies as illustrated for example in FIG. 4d: here a row of fixed video cameras is placed along the horizontal axis O'X' at observation points that will be denoted $M'_{m1}$ (image-acquiring means 4=4 video cameras in a row). The additional viewpoints $M'_{mn}$ (with n≠1) are obtained by means of the rotational altitudewise movement of the heliostats. Alternatively, the video cameras may be aligned vertically and scanned using rotational azimuthwise movements. More generally, it is possible to combine a discrete distribution of the observation video cameras in the target plane O'X'Y' with a heliostat scanning sequence that is optimized both altitudewise and azimuthwise.

The hybrid observation strategy seems perfectly applicable to the focusing heliostats of a central-tower power plant or of the concentrating surface of a solar furnace, and to the planar heliostats of a double-mirror solar furnace. In the case of a solar furnace, images are formed of the concentrating surface in order to inspect the defects of this concentrating surface, and images of the planar heliostats are formed so as to inspect their defects.

Lastly, it will be noted that the constraint of not disrupting the operation of the solar plant may be met by virtue of two different strategies:

1) by using a target plane that is separate from that of the receiver; and
2) by carrying out measurements at night while targeting the full moon.

Specifically, the full moon is also an excellent observable source for the adjustment and inspection of focusing or planar heliostats controlled in open loop. Specifically, observation of the full moon, the apparent diameter of which is similar to that of the sun, allows all the operations of characterization of optomechanical defects to be carried out at night, thus allowing the optimization of the mirrors and heliostats to be performed even more rapidly.

The observed source may either be the sun during the day or the full moon at night.

Whatever the embodiment of the invention, it has the following advantages:

a limited number of commercially available CCD video cameras or even simple webcams.

measurement of the reflective surfaces in situ using at best there natural capacities to track the movements of the sun or moon.

The rest of the process for inspecting and adjusting the reflective surfaces mainly consists in an innovative way of digitally processing the acquired data, which forms the subject matter of the following section.

The general principle of the exploitation of the images may be intuitively explained on the basis of FIGS. 3b and 5a-5b. Let us initially assume that the apparent area of the sun takes the form of a disk of Gaussian profile characterized by the angular luminance equation $L(\alpha,\beta)$:

$$L(\alpha,\beta) = L_0 \exp[(\alpha^2+\beta^2)/2\varepsilon_0^2], \quad (1)$$

where $\varepsilon_0$ is the apparent angular radius of the sun (also shown in FIGS. 1a-c), and $L_0$ the luminance at its center. Let us now consider an observing device $M'_{mn}$ the position of which is given by the coordinates $(x'_{mn}, y'_{mn})$ in the target plane O'X'Y', and from which plane all the points P of the reflective surface are sighted simultaneously. If the optomechanical defects of the mirror at the point P of coordinates (x,y) (including local surface, orientation and aiming errors) are represented by the function $\Delta(P)=\Delta(x,y)$, then the rays generated by the sun, reflected at the point P and collected by the observing device $M'_{mn}$ have, in the coordinate system $O\alpha\beta\gamma$ in FIG. 3a, the angular coordinates:

$$\alpha \approx -\frac{x'_{mn}}{F} + 2\frac{\partial \Delta(P)}{\partial x} \quad (2)$$
$$\beta \approx -\frac{y'_{mn}}{F} + 2\frac{\partial \Delta(P)}{\partial y}$$

where F is the focal length of the concentrating reflective surface, and where the pair $(\alpha,\beta)$ and the angles of incidence on the mirror may be considered to be small in the context of a first-order approximation (this is always true for the angles $\alpha$ and $\beta$; when this is not true for the angles of incidence on the heliostats of a central-tower power plant, this restriction in no way decreases performance). From relationships (1) and (2), it is possible to determine an expression for the solar luminances $L(M'_{mn},P)$ observed from the points $M'_{mn}$ and to deduce therefrom the relationships that relate them to the partial derivatives of the optomechanical defects of the mirror $\Delta(P)$. $L(M'_{mn},P)$ is the luminance at a point of the image corresponding to the point P(x,y) of the optical surface observed from the viewpoint $M'_{mn}$.

In the particular case of four viewpoints $M'_{11}$, $M'_{12}$, $M'_{21}$ and $M'_{22}$ located at the corners of a rectangle in the target plane of length $2\delta x'$ along the axis X' and $2\delta y'$ along the axis Y', as indicated in FIG. 3b, the coordinates of the four viewpoints $M'_{11}$, $M'_{12}$, $M'_{21}$ and $M'_{22}$ in the plane O'X'Y' are respectively written $(-\delta x', -\delta y')$, $(-\delta x', \delta y')$, $(\delta x', -\delta y')$ and $(\delta x', \delta y')$. By inserting these coordinates into the relationships (2), then by inserting the latter into the solar luminance equation (1), a system of four equations in two unknowns $\delta\Delta(P)/\delta x$ and $\delta\Delta(P)/\delta y$ is obtained $$L(M'_{11}, P) = L_0 \exp\left[-\frac{1}{2\varepsilon_0^2}\left[\left(2\frac{\partial\Delta(P)}{\partial x} + \frac{\delta x'}{F}\right)^2 + \left(2\frac{\partial\Delta(P)}{\partial x} + \frac{\delta y'}{F}\right)^2\right]\right],$$

$$L(M'_{12}, P) = L_0 \exp\left[-\frac{1}{2\varepsilon_0^2}\left[\left(2\frac{\partial\Delta(P)}{\partial x} - \frac{\delta x'}{F}\right)^2 + \left(2\frac{\partial\Delta(P)}{\partial x} + \frac{\delta y'}{F}\right)^2\right]\right],$$

-continued $$L(M'_{21}, P) = L_0 \exp\left[-\frac{1}{2\varepsilon_0^2}\left[\left(2\frac{\partial\Delta(P)}{\partial x} + \frac{\delta x'}{F}\right)^2 + \left(2\frac{\partial\Delta(P)}{\partial x} - \frac{\delta y'}{F}\right)^2\right]\right],$$

$$L(M'_{22}, P) = L_0 \exp\left[-\frac{1}{2\varepsilon_0^2}\left[\left(2\frac{\partial\Delta(P)}{\partial x} - \frac{\delta x'}{F}\right)^2 + \left(2\frac{\partial\Delta(P)}{\partial x} - \frac{\delta y'}{F}\right)^2\right]\right].$$

By taking Napierian logarithms on the left and right of the = sign in each relationship, a linear system of four equations in two unknowns is obtained that may be solved analytically in the least-square sense. In this way, the relationships (3) are obtained:

$$\frac{\partial\Delta(P)}{\partial x} = -\frac{F\varepsilon_0^2}{4\delta x'}\log\left[\frac{L(M'_{22}, P)}{L(M'_{21}, P)}\frac{L(M'_{12}, P)}{L(M'_{11}, P)}\right] \quad (3)$$

$$\frac{\partial\Delta(P)}{\partial y} = -\frac{F\varepsilon_0^2}{4\delta y'}\log\left[\frac{L(M'_{22}, P)}{L(M'_{12}, P)}\frac{L(M'_{21}, P)}{L(M'_{11}, P)}\right],$$

From a physical point of view, the principle of the method consists in using the luminance profile of the solar disk (up to now assumed to be Gaussian), the profile being decentered with respect to the theoretical observation directions defined by the points $M'_{mn}$ because of the effect of the optomechanical defects $\Delta(P)$. It is thus possible to calculate these defects from luminance differences measured at the points $M'_{mn}$, as illustrated in FIG. 5a. This figure shows the measurements taken at two observation points $M'_{11}$ and $M'_{12}$ on a well aligned mirror (=black dots) and the measurements taken on a misaligned mirror (=white dots).

However, the solar luminance equation is in fact only rarely Gaussian, even though it may be under certain types of cloud cover. In the case of a nongaussian profile that nonetheless monotonically decreases from the center to the edge, the following more general mathematical relationships are obtained:

$$\frac{\partial\Delta(P)}{\partial x} = g_x \, \varepsilon_0 \frac{L(M'_{22}, P) - L(M'_{21}, P) + L(M'_{12}, P) - L(M'_{11}, P)}{L(M'_{22}, P) + L(M'_{21}, P) + L(M'_{12}, P) + L(M'_{11}, P)} \quad (4)$$

$$\frac{\partial\Delta(P)}{\partial Y} = g_y \, \varepsilon_0 \frac{L(M'_{22}, P) - L(M'_{12}, P) + L(M'_{21}, P) - L(M'_{11}, P)}{L(M'_{22}, P) + L(M'_{21}, P) + L(M'_{12}, P) + L(M'_{11}, P)},$$

where gx and gy are gain coefficients along the two axes X and Y. The numerical values of these coefficients obviously depend on those of the parameters $\varepsilon_0$, $\delta x'$ and $\delta y'$, but also on the luminance relationship of the observed object at the time of the measurement. For this reason in practice the values of $g_X$ and $g_Y$ are determined experimentally.

Lastly, in the most common case where the profile of the sun is uniform as illustrated in FIG. 5b, the preceding equations do not yield satisfactory results. Specifically, the slopes of the profile of the sun, which are directly related to the partial derivatives $\delta\Delta(P)/\delta x$ and $\delta\Delta(P)/\delta y$ of the slope of the reflective surface, are too pronounced.

The solution according to the invention is based on an increase in the number of observation points. This then amounts to extending relationships (4) to the case of M×N different observation points of known position (where M×N>4), said points being distributed in the target plane; these M×N observation points are advantageously located on a regular grid centered on the point O'. These new relationships are then written:

$$\frac{\partial \Delta(P)}{\partial x} = g_X \, \varepsilon_0 \frac{\sum_{m=1}^{M} \sum_{n=1}^{N} \mathrm{sign}(x'_{mn}) \, L(M'_{mn}, P)}{\sum_{m=1}^{M} \sum_{n=1}^{N} L(M'_{mn}, P)} \quad (5)$$

$$\frac{\partial \Delta(P)}{\partial y} = g_Y \, \varepsilon_0 \frac{\sum_{m=1}^{M} \sum_{n=1}^{N} \mathrm{sign}(y'_{mn}) \, L(M'_{mn}, P)}{\sum_{m=1}^{M} \sum_{n=1}^{N} L(M'_{mn}, P)},$$

where the analytical function sign(u) is equal to u/|u|. The physical interpretation of the latter relationships is illustrated in FIG. 5b: specifically, by virtue of the accumulation of the various viewpoints M'$_{mn}$, said relationships allow the real sun, which most often presents as a disk of uniform luminance, to be converted into a "fictional sun" with gentler slopes. Said fictional sun may be understood to be the product of a convolution of the uniform solar luminance equation with a distribution representing the positions of the observation points M'$_{mn}$ in the target plane. The fictional-sun luminance curve thus generated then has less pronounced slopes, compatible with equations (5).

Figure 6:
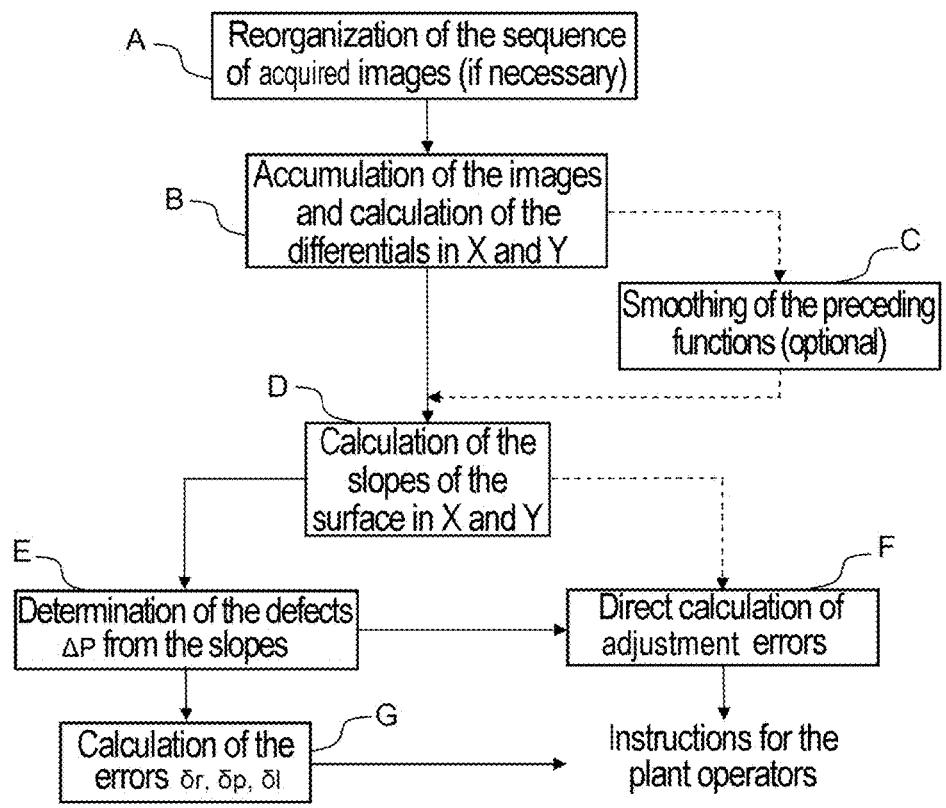
FIG. 6 is a flowchart showing the steps of an exemplary method for processing the data required from various viewpoints according to invention.

The overarching logic of the data processing method is presented in the flowchart in FIG. 6. It may be decomposed into six main steps:

A) Reorganization of the sequence of the acquired images 5. This step is optional, and in fact depends on which of the various observation strategies that were presented above is being used. The simplest case is obviously that of one and only one video camera that is movable in the focal plane, in which case the coordinates x'$_{mn}$ and y'$_{mn}$ are returned directly by the mechanisms for moving the video camera, and the relationships (5) may be applied as such. In all the other cases, it is necessary to calculate the fictional coordinates of the virtual observation points M'$_{mn}$ from characteristic data of the observation sequence, such as the direction of the sun (which direction itself depends on the measurement time and date), the position and the movement of the heliostats, and the location of the video cameras in the target plane.

B) Summation of the images and their partial derivatives. This step consists in calculating the double sums of the numerators and denominator in the relationships (5). Depending on the geometric outline of the observed surfaces, it is also possible to restrict the field of observation of the points M'$_{mn}$ to a circular zone of radius of about F·ε0.

C) Smoothing of the sums calculated in the preceding step. Here this is an optional procedure: depending on the total number of images acquired from the points M'$_{mn}$, their weighted sums calculated in the preceding step may have a "granular" appearance with breaks in slopes corresponding to the outlines of the image of the solar disk moving over the surface of the mirrors. It is then possible to smooth these images by means of a (Gaussian inter alia) filter in order to "soften" the profile of the fictional sun in FIG. 5b. This option proves to be particularly useful when the total number of points M'$_{mn}$ is not very high (typically lower than 10×10).

D) Calculation of the slopes $\partial \Delta(P)/\partial X$ and $\partial \Delta(P)/\partial Y$ of the reflective surface. Here, the analytical relationships defined by equations (5) are applied directly in order to measure the partial derivatives $\partial \Delta(P)/\partial X$ and $\partial \Delta(P)/\partial Y$ of the optomechanical defects. This requires, experimentally for example, the optimal values of the gain coefficients g$_X$ and g$_Y$ featuring in relationships (5) to be identified.

E) Determination of the optomechanical defects Δ(P) from their slopes. It is of course possible to determine the optomechanical defects of the mirrors Δ(P) from their partial derivatives determined in the preceding step. In fact this is a conventional problem in adaptive optics that is discussed—inter alia—by Southwell in the publication "Wave-front estimation from waveform slope measurements", J. Opt. Soc. Am. Vol 70, p 998-1006. Here we have used the "zonal reconstruction of A type" described in the original article.

F) and G) calculation of the surface errors δl, the errors δr in the orientation of the facets with respect to one another or errors δp in the overall aim of the mirror. These calculations may be carried out in two different ways, as shown in the flowchart: firstly, it is possible (step G) to estimate the slopes of the various facets of the segmented mirror from the surface defects Δ(P) measured in the preceding step, for example by means of a decomposition into Zernike polynomials allowing angular errors and focal defects to be calculated.

It is also possible (step F) to directly calculate the orientation errors δr by averaging the values of the partial derivatives $\partial \Delta(P)/\partial X$ and $\partial \Delta(P)/\partial Y$ measured at the surface of the individual facets in step D. In each and every case, the errors δp in the aim of the reflective surface may be estimated as arithmetic means of the errors affecting each individual facet. The main difference between these two procedures, which have both been tested in the numerical simulations presented in the following section, essentially resides in their effective calculation time, and in the nature of the sought information (alignment errors, misfocus, higher-order defects, etc.).

All of the operations for measuring the local surface errors δl, adjustment errors δr and aiming errors δp of the reflective surfaces of the heliostats may be completely automated.

Once the errors have been determined, the latter are converted into instructions for adjustment of the reflective surfaces, which may be executed manually or automatically if the concentrating surface is equipped with controlled actuators.

In order to validate these methods for optimizing reflective surfaces, a plurality of numerical simulations of the performance of concentrated solar power systems were carried out. Two main types of concentrators were studied: firstly a segmented parabolic concentrator directly servo-controlled on the sun, and secondly a focusing heliostat located in the field of a solar-electric central-tower power plant.

Figure 1B:
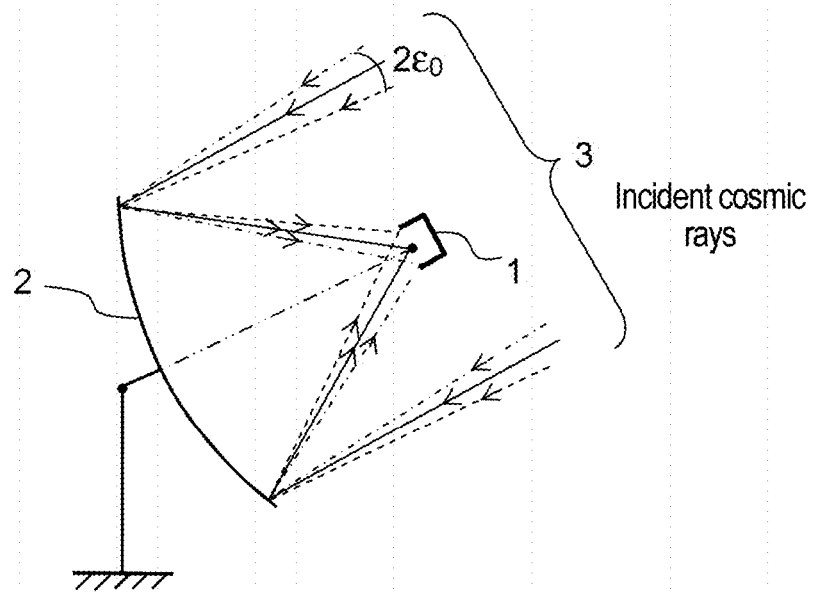
Figure 1C:
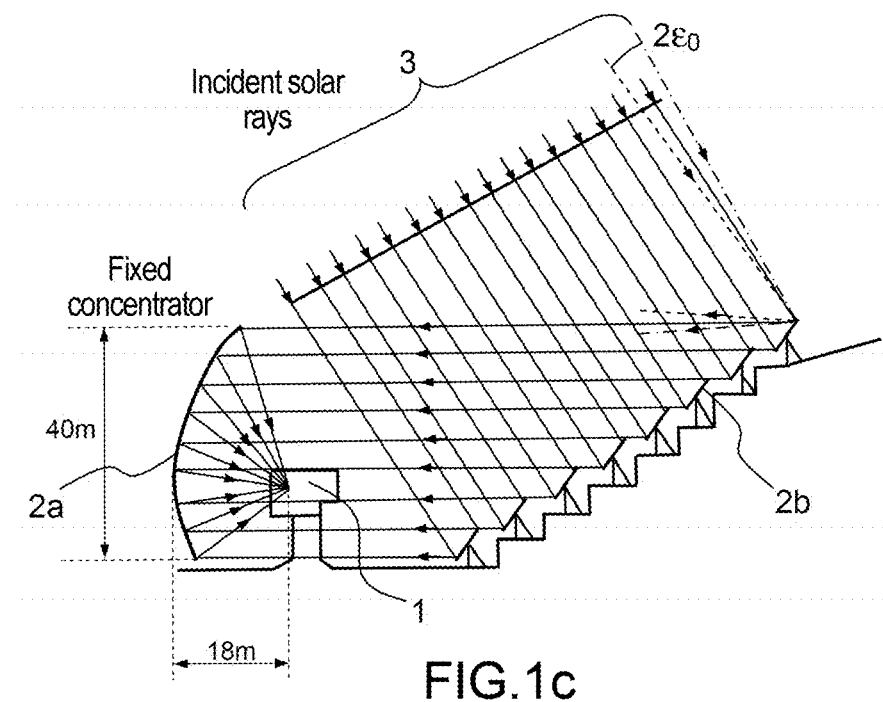
Figure 2:
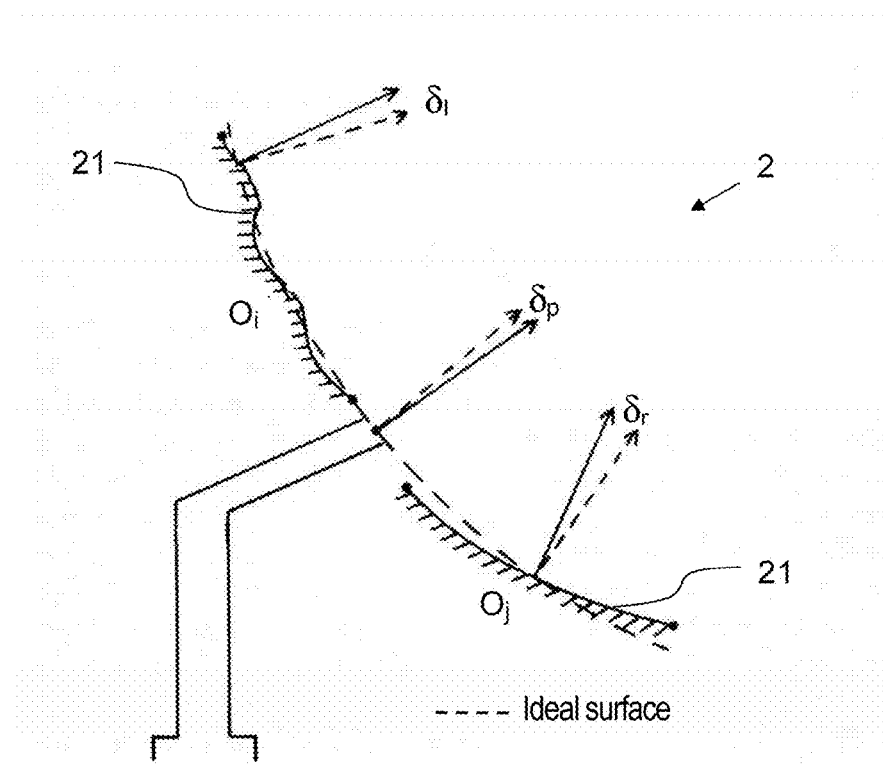
FIG. 2, which was described above illustrates the main characteristic errors of an apparatus for concentrating cosmic radiation when its reflective surfaces are segmented into facets.
Figure 7A:
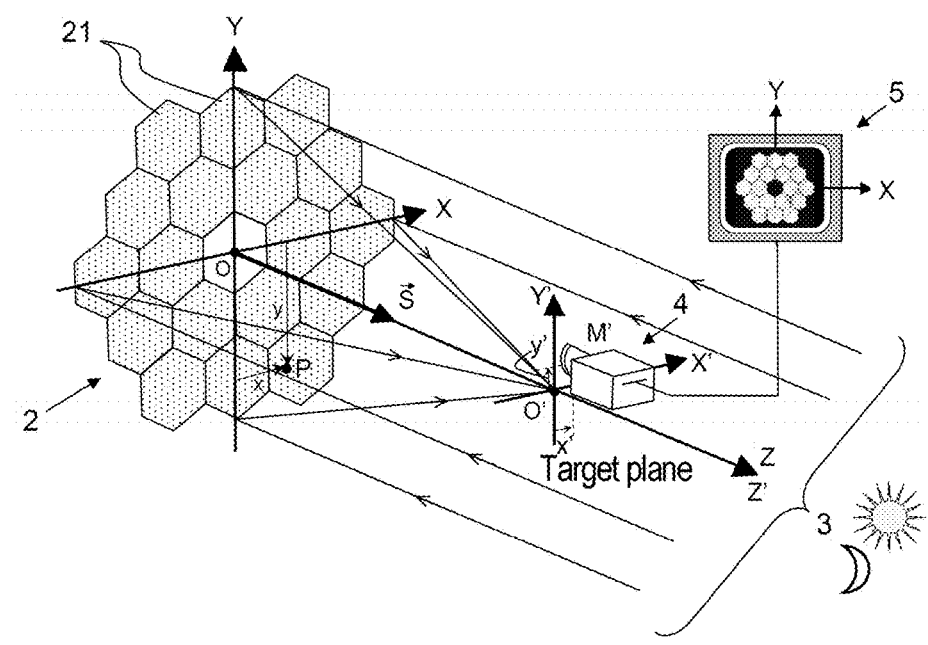
FIGS. 7a-7d illustrate the results obtained with an apparatus according to the invention such as described in FIG. 1b i.e. one having a orientable segmented reflective surface associated with a video camera, the apparatus being schematically shown (FIG. 7a) with a sequence of images obtained by the video camera (FIG. 7b), the real and measured errors and the corresponding measurement errors being shown in false colors (FIG. 7c) and in three dimensions (FIG. 7d)

Case of a Parabolic Concentrator:

Let us first consider the case of a parabolic concentrator directly servocontrolled on the sun (this case is also applicable to radiation-collecting telescopes of the Cherenkov type) as shown in FIG. 7a (which corresponds to the case in FIG. 1b and for which the angle of incidence of the cosmic rays between the vectors $\vec{S}$ and $\vec{N}$ is almost 0: $\vec{S}=\vec{N}=\vec{R}$) or illuminated by one or more planar heliostats (case of a solar furnace, FIG. 1c). In general, these are concentrator systems of very high numerical aperture, typical parameters of which are given in the second column of table 1 below. The main characteristics of the measuring device (zone to be scanned and number of measuring points in the target plane), and the main characteristics of the optomechanical defects to be measured have also been indicated in this table. In the numerical simulations, these defects were modelled by random draws the standard deviations of which are indicated in the three last rows of the table:

Random errors $\delta r$ in the alignment of the facets about the axes X and Y of the concentrator (i.e. "tip-tilt" errors) were modelled by normal distributions of 2 mrad standard deviation.

Lastly, the local surface errors $\delta l$ of the facets were simulated by the deviations of their radii of curvature R and their coefficients of asphericality $\epsilon$, which are indicated in the table (the theoretical values of the radius of curvature and coefficient of asphericality of this parabolic surface being R=20 m and $\epsilon$=−1, respectively) and set equal to the means of the Gaussian error distributions. This allowed shape errors of up to the fourth order to be introduced.

Here, $\delta p=0$.

TABLE 1

| PARAMETERS OF THE NUMERICAL SIMULATIONS | Parabolic concentrator | Focusing heliostat |
| --- | --- | --- |
| Dimensions of the concentrating reflective surface | 5 m diameter | 7 × 6 m² |
| Focal length of the concentrating reflective surface | 10 m | 100 m |
| Numerical aperture of the concentrating reflective surface | F/2 | F/11 |
| Number of facets | 18 | 4 × 2 |
| Dimensions of the facets | 1 m diameter | 1.4 × 2.8 m² |
| Area scanned in the target plane | 0.1 × 0.1 m² | 0.7 × 0.7 m² |
| Number of observation points | 24 × 24 | 24 × 24 |
| Standard deviation of the errors $\delta r$ in the orientation of the facets | 2 mrad | 0.5 mrad |
| Standard deviation of the radius-of-curvature errors | 0.5 m $\}$ $\delta l$ | — |
| Standard deviation of the errors in the coefficient of asphericality | 0.5 | |

Figure 7B:
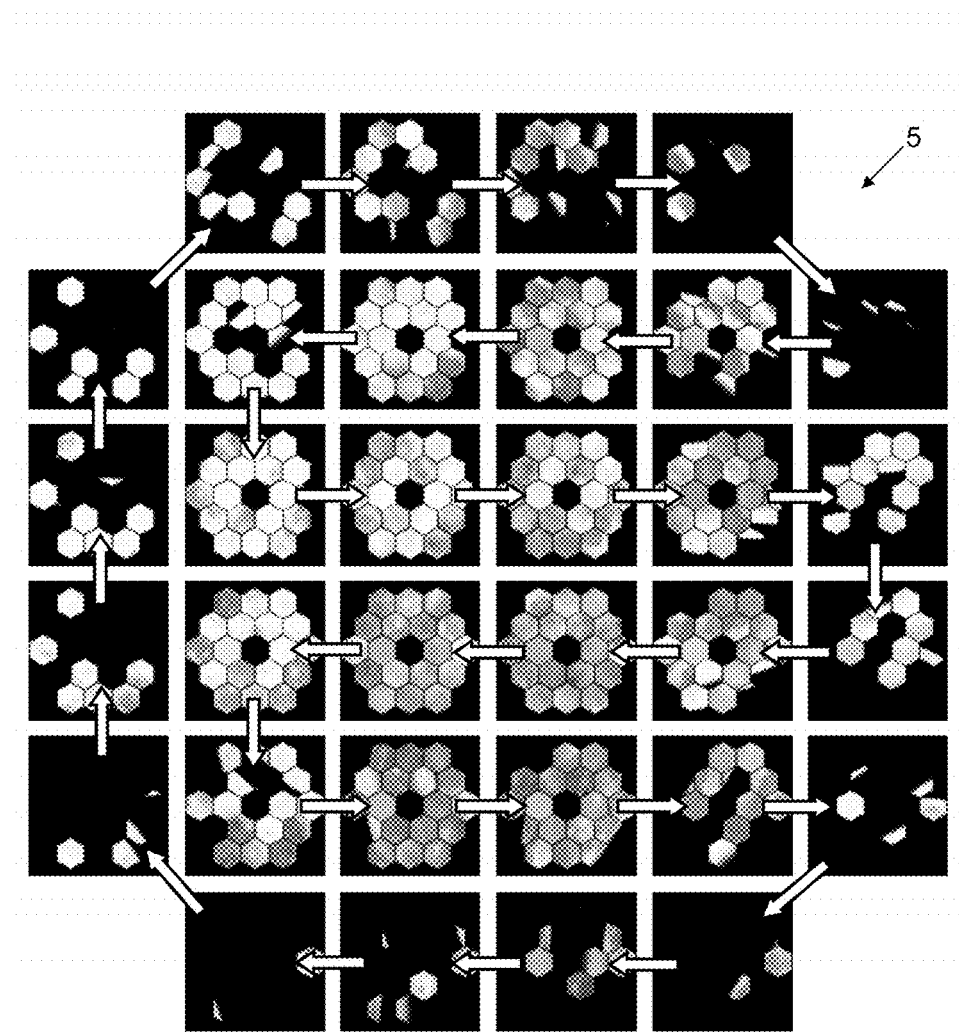

Taking into account all of the above parameters, FIG. 7b reproduces an acquisition sequence of 32 images L(M'mn,P) seen from the target plane and extracted from the complete sequence of 24×24 images simulated by a ray tracing software package. Although all the numerical calculations were carried out here with a uniform solar luminance equation, FIG. 7b shows the images that would be observed if a full moon were targeted, in order to aid comprehension and also for esthetic reasons. One possible temporal scan sequence is indicated by the arrows in the figure.

Figure 7C:
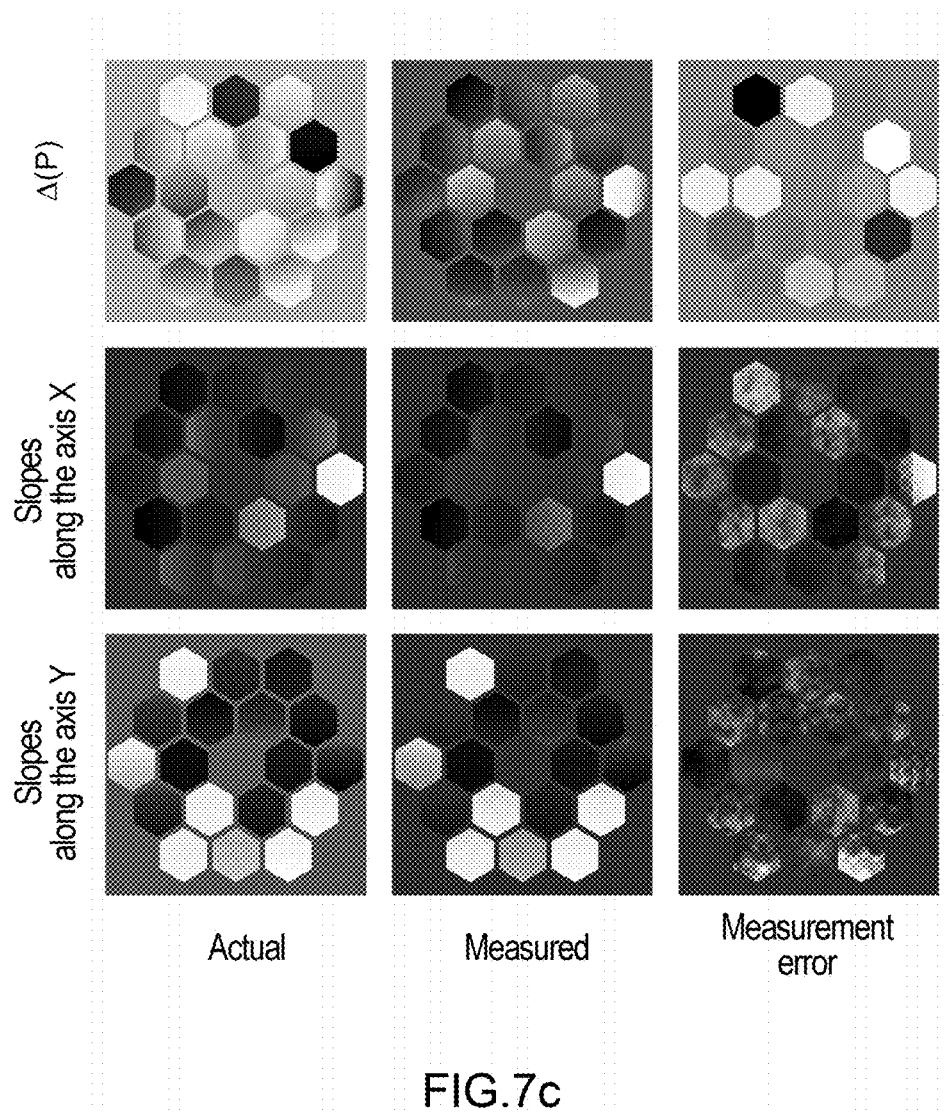
Figure 7D:
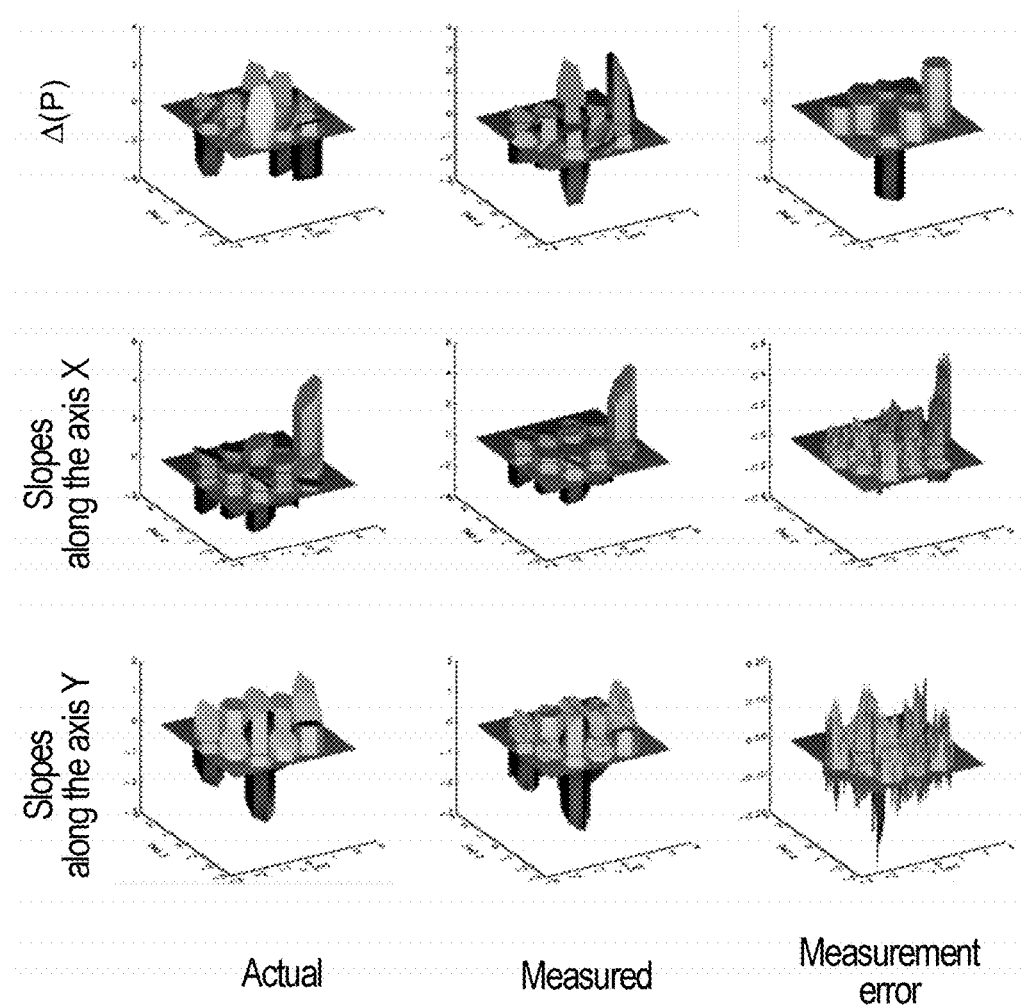

The results obtained from the calculation of the slopes along the X and Y axes and from the determination of the optomechanical defects $\Delta(P)$, are presented in the upper half of table 2 below. They are quantified in terms of the peak-to-valley errors (PTV) and the standard deviations (RMS) characterizing the actual optomechanical defects (first column), those actually measured by the system (second column), and their absolute and relative differences (third and fourth columns). Views of these various defect maps are also shown in false colors and in three dimensions in FIGS. 7c and 7d. The results obtained for the slope measurements seem particularly promising since the PTV and RMS errors are lower than 15 and 6%, respectively. However, it is reasonable to hope that in terms of a new sequence of realignment, then of inspection of the concentrator following the same procedure, these numbers will exhibit a significant further improvement. It will be noted that in the measurement error maps presented in the top right panels of FIGS. 7c and 7d the local surface errors $\delta l$ and orientation errors $\delta r$ have disappeared.

It was also observed that axial positioning errors on each of the facets of the reflective surface ("pistons") did not disrupt the calculation of the slopes.

TABLE 2

| | Actual | | Measurements | | Measurement errors | | Relative errors (%) | |
| --- | --- | --- | --- | --- | --- | --- | --- | --- |
| | PTV | RMS | PTV | RMS | PTV | RMS | PTV | RMS |
| Parabolic concentrator | 6.43 | 1.09 | 5.40 | 0.75 | 5.97 | 1.24 | 92.9 | 113.3 ΔP (mm) |
| | 6.20 | 1.10 | 6.81 | 1.10 | 0.84 | 0.12 | 13.5 | 10.7 Slopes in X (mrad) |
| | 3.93 | 1.05 | 4.23 | 1.04 | 0.58 | 0.06 | 14.8 | 5.7 Slopes in Y (mrad) |
| Focusing heliostat | 10.52 | 1.77 | 6.92 | 1.03 | 5.27 | 0.75 | 50.1 | 42.6 ΔP (mm) |
| | 7.28 | 1.66 | 4.40 | 0.86 | 0.40 | 0.04 | 5.5 | 2.5 Slopes in X (mrad) |
| | 5.88 | 1.31 | 4.40 | 1.01 | 0.35 | 0.05 | 6.0 | 3.9 Slopes in Y (mrad) |

To conclude, the measurement errors in the optomechanical defects $\Delta(P)$ of a surface for concentrating solar energy of large numerical aperture, such as those that were simulated here, seem very satisfactory and compatible with the performance sought for this type of installation.

Case of a Focusing Heliostat:

Let us consider a reflective surface of a focusing heliostat located in the field of a central-tower power plant. This case is more general but also more complex than that of concentrators directly (or indirectly in the case of a solar furnace illuminated by planar heliostats) pointed toward the sun, because the heliostat must then play a dual role: on the one hand, tracking the daytime movement of the sun in the sky, and on the other hand, concentrating the rays on the receiver (boiler) located at the top of the tower. The main consequence is that the orientation of the vectors $\vec{S}$ and $\vec{N}$ representing the directions of the sun and of the normal to the reflective surface of the heliostat (see FIG. 3a) changes constantly: therefore it is no longer true that $\vec{S}=\vec{N}=\vec{R}$. The optimal shape of the reflective surface of the heliostat is then defined empirically as a parabola of radius of curvature equal to two times its distance to the boiler. However, this type of reflective surface has two intrinsic geometric aberrations, called coma and astigmatism, the amplitudes of which increase rapidly with the dimensions of the heliostat and with the value of the angle of incidence between the vectors $\vec{S}$ and $\vec{N}$. Therefore, relationships (2) must now be written:

$$\alpha \approx -\frac{x'_{mn}}{F} + 2\frac{\partial \Delta(P)}{\partial x} + \frac{\partial \Delta_{Coma}(P)}{\partial x} + \frac{\partial \Delta_{Astig}(P)}{\partial x} \quad (6)$$

$$\beta \approx -\frac{y'_{mn}}{F} + 2\frac{\partial \Delta(P)}{\partial y} + \frac{\partial \Delta_{Coma}(P)}{\partial y} + \frac{\partial \Delta_{Astig}(P)}{\partial y},$$

where the additional parameters $\Delta_{Coma}(P)$ and $\Delta_{Astig}(P)$ designate the "natural" comatic and astigmatic aberrations of the focusing heliostat. It is therefore necessary to eliminate these aberrations during the data processing. In practice, this implies subtracting them from the slopes and optomechanical defects calculated in steps D and E of the data-processing procedure described with reference to the flowchart in FIG. 6. The wavefront errors $\Delta_{Coma}(P)+\Delta_{Astig}(P)$ and their reference slopes, i.e. those calculated assuming the reflective surface of the heliostat is perfectly spherical and exempt of orientation errors $\delta r$ and surface errors $\delta 1$, may be calculated using the ray tracing software packages which were used to simulate the images $L(M'_{mn},P)$ in FIGS. 7b and 8a. The reference maps obviously depend on the general parameters of the studied configuration: position of the sun in the sky, location of the heliostat in the field of the central-tower power plant, coordinates of the target, focal length of the reflective surface of the heliostat, etc.

Figure 8A:
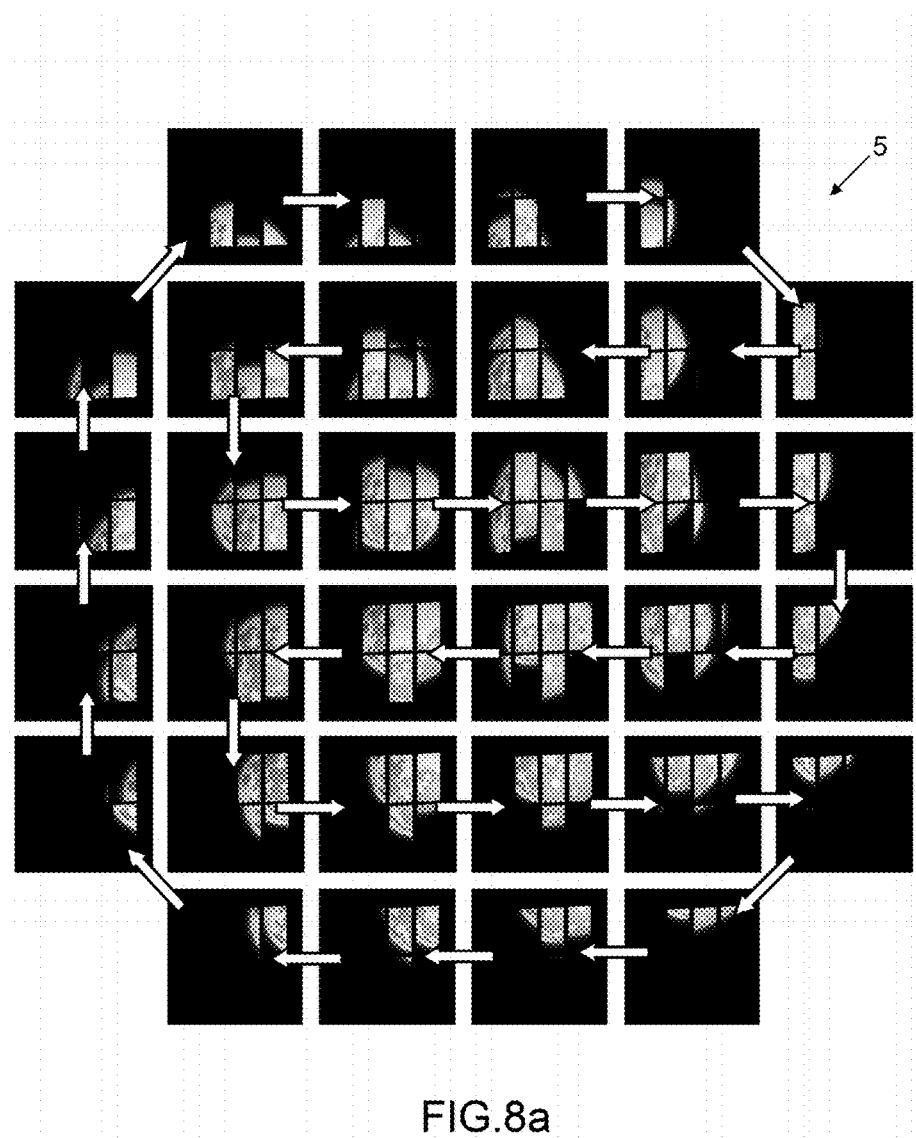
FIGS. 8a-8c illustrate the results obtained with an apparatus according to the invention such as described in FIG. 1a i.e. one having an orientable segmented reflective surface associated with a video camera, which apparatus is schematically shown FIGS. 4a-4d, with a sequence of images obtained by the video camera (FIG. 8a), the real and measured errors and the corresponding measurement errors being shown in false colors (FIG. 8b) and in three dimensions (FIG. 8c).

The main results obtained are presented in the same way as for the preceding example. The geometric parameters of the reflective surface of the heliostat are given in the third column in table 1. Here the only errors modelled are errors in the orientation of the facets of the reflective surface of the heliostat, of standard deviation equal to 0.5 mrad. In order to demonstrate the full potential of the method, a rather unfavorable geometric configuration in which the angles of solar incidence on the reflective surface of the heliostat were about 25 degrees, thus generating high natural comatic and astigmatic aberrations, was employed. A sequence of images $L(M'_{mn},P)$ observed on the surface of the heliostat when a full moon was targeted is shown in FIG. 8a.

Figure 8B:
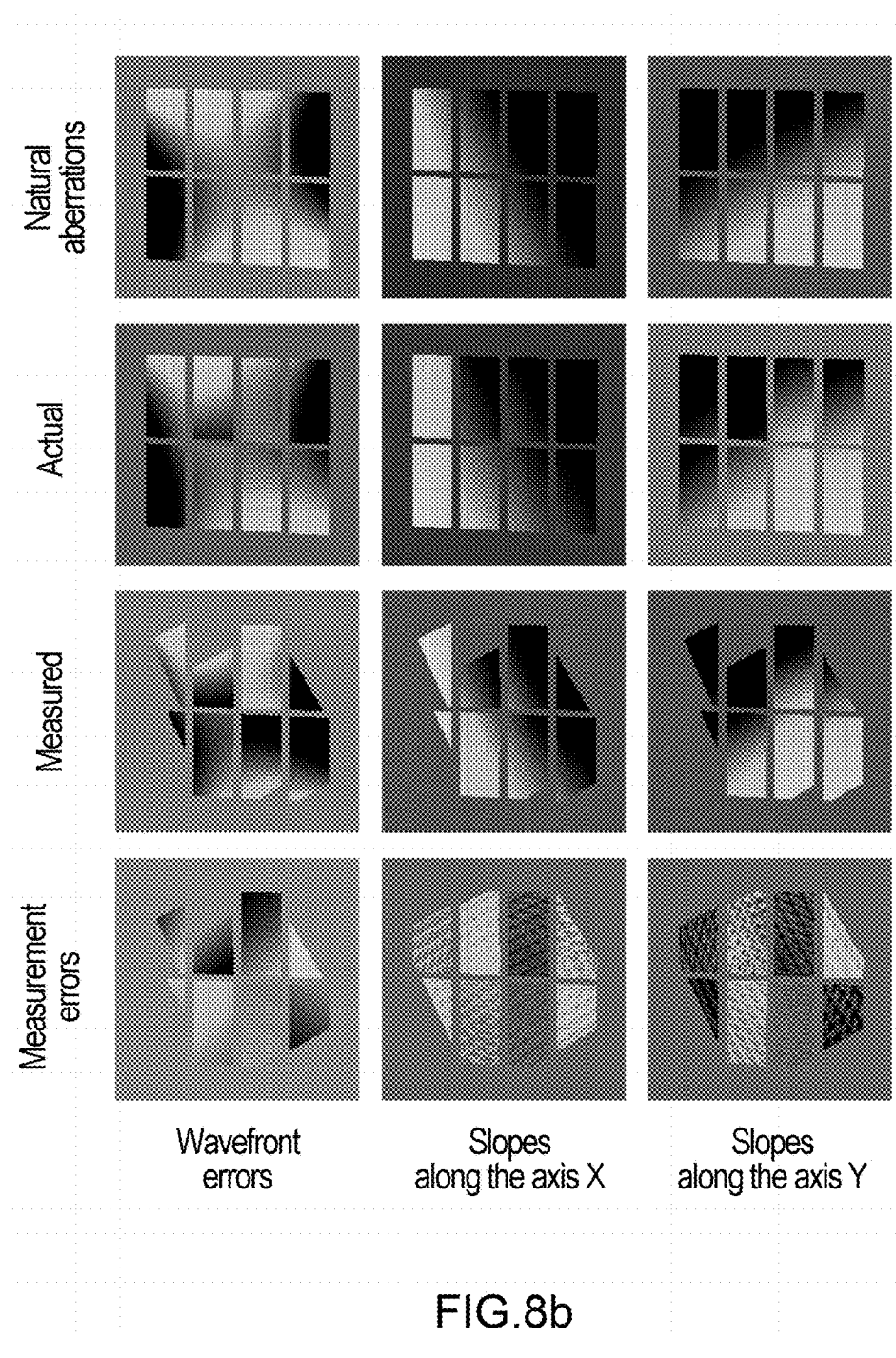
Figure 8C:
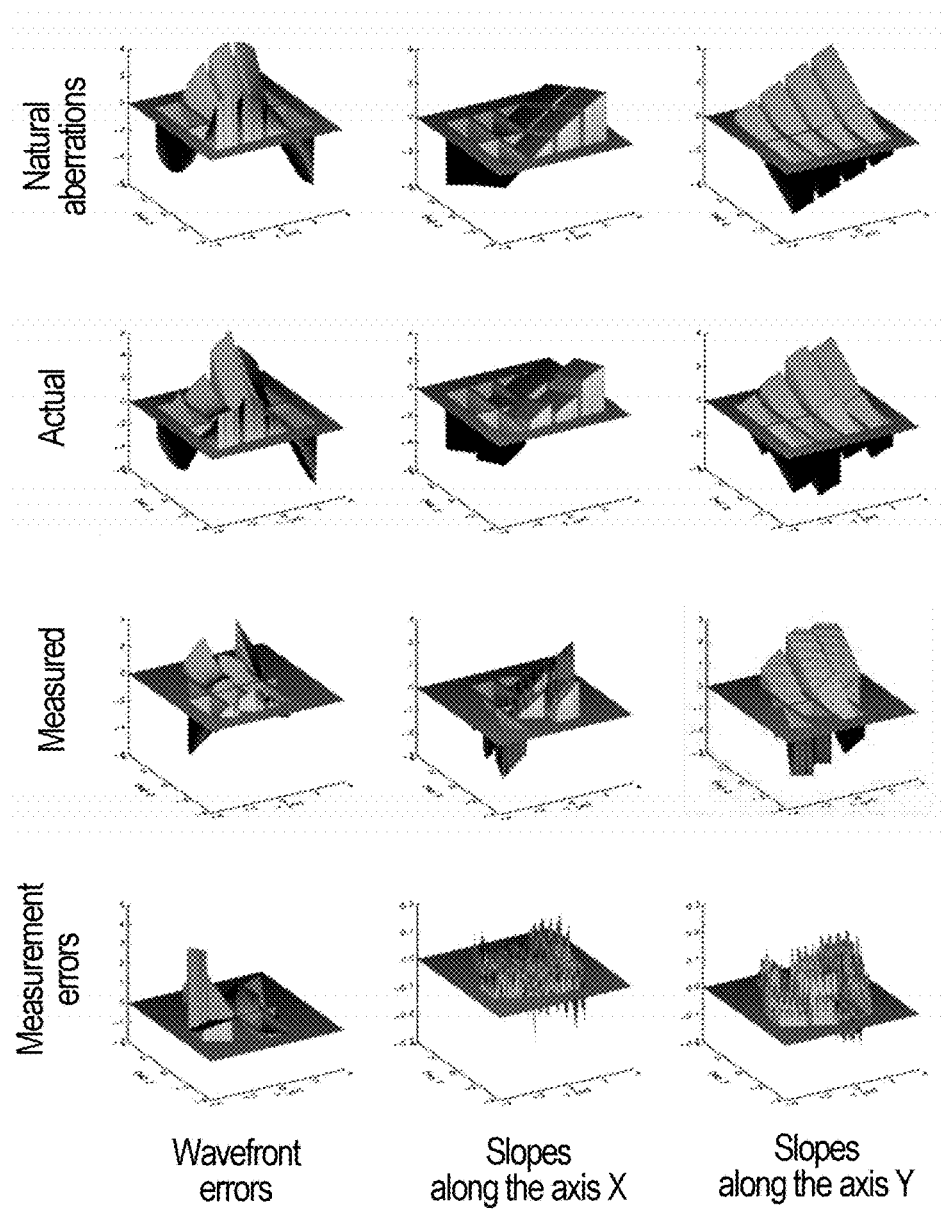

The errors in the measurement of the optomechanical defects $\Delta(P)$ and of their slopes along the axes X and Y in terms of peak-to-valley and RMS errors are presented in the bottom half of table 2. Views in false colors and in three dimensions of the calculated error maps are reproduced in FIGS. 8b and 8c. The general appearance of these figures is similar to that in the preceding section, except for their first rows, which exhibit the natural comatic and astigmatic aberrations of the ideal reflective surface of the heliostat.

Lastly, the errors $\delta r$ in the measurement of altitudewise and azimuthwise misadjustment of the eight facets of the reflective surface of the focusing heliostat, which measurements were carried out at the end of two iterations of the inspection and adjustment sequence, are indicated in table 3. All these figures and graphical representations allow the following conclusions to be drawn:

the peak-to-valley and RMS errors in the measurements of the slopes of the surface of the focusing heliostat are even better than those of the parabolic concentrator, being lower than 6 and 4%, respectively. This is probably partially due to the small numerical aperture of the heliostat (here F/11).

In addition, the relative errors in the angular misalignments of the facets of the reflecting surface of the heliostat are the order of 2% peak-to-valley and 1.5% RMS, an excellent performance that it is probably possible to improve with additional iterations. However, this would not seem to be truly necessary as residual alignment errors smaller than 0.01 mrad are largely negligible with respect to the apparent angular diameter of the sun (about 10 mrad).

TABLE 3

| ALIGNMENT ERRORS $\delta r$ (mrad) | | MEASUREMENT ERRORS (mrad) | | RELATIVE ERRORS (%) | |
|---|---|---|---|---|---|
| Azimuth | Altitude | Azimuth | Altitude | Azimuth | Altitude |
| 0.31 | 0.42 | 0.00 | −0.01 | 0.20 | 2.37 |
| −0.216 | −0.233 | 0.002 | 0.002 | 1.0 | 1.0 |
| 0.233 | 0.225 | −0.012 | −0.002 | 5.4 | 0.7 |
| −0.199 | 0.313 | 0.009 | −0.010 | 4.6 | 3.3 |
| 0.153 | 0.204 | −0.002 | −0.002 | 1.5 | 0.8 |
| 0.020 | −0.046 | 0.000 | 0.001 | 1.5 | 1.9 |
| −0.135 | 0.266 | 0.005 | −0.014 | 3.8 | 5.2 |
| | RMS Errors | 0.006 | 0.006 | 2.0 | 1.5 |

The numerical simulations presented here show that the measurement precision achieved is largely compatible with the performance expected for these various types of concentrated solar power systems.

With respect to the prior art, the solution according to the invention is extremely adaptable and has the essential advantage of being implementable in a plant or telescope in operation, without disrupting solar-electricity generation in the case of a solar plant.

In addition, the solution according to the invention allows the time taken to commission the plant or telescope to be decreased, and is applicable to the main types of existing discrete concentrated solar power systems (central-tower power plants, concentrators pointed directly toward the sun, double-mirror solar furnaces, etc.). This for example allows heliostats that are in the process of defocusing to be detected in order to return them to their rest position, for example for reasons of aviation safety.

The solution according to the invention allows all of the reflective surfaces of the telescope or plant to be inspected and adjusted in the shortest possible time. By automating the adjusting process, human interventions are decreased to a simple periodic readjustment of the reflecting surfaces from numerical values determined in advance. In the case of a central-tower power plant, an ambitious but achievable objective is to allow one hundred heliostats to be adjusted per day. This minimal time may itself be decreased to an inspection and adjustment in real-time when the mirrors themselves are equipped with actuators that are remotely controllable from the processing unit in charge of the inspection

The invention claimed is:

1. An apparatus for concentrating cosmic radiation originating from a celestial object of nonzero apparent angular radius, said apparatus comprising:
   a reflective optical surface able to reflect incident cosmic radiation toward a target surface O'X'Y' in order to form thereon, and liable to contain local surface errors and aiming and orientation errors; and
   a system for inspecting the reflective optical surface; wherein
   the inspecting system comprises:
   at least one camera that is configured to acquire images of the reflective optical surface from various viewpoints $M'_{mn}(x'_{mn}, y'_{mn})$ that are located inside the area of the image of the celestial object on the target surface, m being an integer varying from 1 to M and n being an integer varying from 1 to N, so as to obtain M×N images of the reflective optical surface illuminated by the cosmic radiation, with M viewpoints along X' and N viewpoints along Y', where M>1, N>1 and M×N≥30; and
   a processor that is configured to process the M×N acquired images by:
   calculating slopes $\delta\Delta(P)/\delta x$ and $\delta\Delta(P)/\delta y$ for each point P(x,y) of the reflective optical surface, where:

$$\frac{\partial \Delta(P)}{\partial x} = g_X \, \varepsilon_0 \frac{\sum_{m=1}^{M}\sum_{n=1}^{N} \text{sine}(x'_{mn}) \, L(M'_{mn}, P)}{\sum_{m=1}^{M}\sum_{n=1}^{N} L(M'_{mn}, P)}, \text{ and}$$

$$\frac{\partial \Delta(P)}{\partial y} = g_Y \, \varepsilon_0 \frac{\sum_{m=1}^{M}\sum_{n=1}^{N} \text{sine}(y'_{mn}) \, L(M'_{mn}, P)}{\sum_{m=1}^{M}\sum_{n=1}^{N} L(M'_{mn}, P)}$$

$L(M'_{mn}, P)$ being a luminance at a point of the image corresponding to the point P(x,y) of the reflective optical surface observed from the viewpoint $M'_{mn}(x'_{mn}, y'_{mn})$, co the apparent angular radius of the celestial object and $g_x$ and $g_y$ preset coefficients; and
   determining from these slopes $\delta\Delta(P)/\delta x$ and $\delta\Delta(P)/\delta y$, a local surface error $\Delta P(x,y)$ at the point P(x,y) of the reflective optical surface.

2. The apparatus for concentrating cosmic radiation as claimed in claim 1, wherein the at least one camera includes a plurality of cameras for acquiring images, which cameras are respectively located at various fixed or movable positions on the target surface.

3. The apparatus for concentrating cosmic radiation as claimed in claim 1, wherein the reflective optical surface to be inspected is orientable.

4. The apparatus for concentrating cosmic radiation as claimed in claim 3, wherein the at least one camera is located on the target surface and the apparatus for concentrating cosmic radiation further comprises an actuator that is configured to modify the orientation of the reflective optical surface to be inspected.

5. The apparatus for concentrating cosmic radiation as claimed in claim 1, wherein the reflective optical surface is segmented into facets and wherein the processor is suitable for furthermore determining errors in the orientation of the facets with respect to one another and an adjustment error of each facet.

6. The apparatus for concentrating cosmic radiation as claimed in claim 1, wherein the reflective optical surface is mounted in a heliostat.

7. The apparatus for concentrating cosmic radiation as claimed in claim 1, wherein the reflective optical surface is parabolic.

8. The apparatus for concentrating cosmic radiation as claimed in claim 1, further comprising a plurality of reflective optical surfaces, the reflective optical surface being one of the plurality of reflective optical surfaces.

9. The apparatus for concentrating cosmic radiation as claimed in claim 1, wherein the incident cosmic radiation is solar or lunar.

10. The apparatus for concentrating cosmic radiation as claimed in claim 1, wherein the target surface is planar.

11. A central-tower power plant or individual concentrator or double-mirror solar furnace or Cherenkov telescope including an apparatus for concentrating cosmic radiation as claimed in claim 1.

* * * * *

UNITED STATES PATENT AND TRADEMARK OFFICE
CERTIFICATE OF CORRECTION

PATENT NO. : 10,309,689 B2
APPLICATION NO. : 15/127746
DATED : June 4, 2019
INVENTOR(S) : François Henault et al.

It is certified that error appears in the above-identified patent and that said Letters Patent is hereby corrected as shown below:

In the Claims

In Claim 1, Column 17, Line 42, "co the apparent angular" should be -- $\varepsilon 0$ the apparent angular --.

Signed and Sealed this
Twentieth Day of August, 2019

Andrei Iancu
*Director of the United States Patent and Trademark Office*